United States Patent
Wu et al.

[11] Patent Number: 6,156,422
[45] Date of Patent: Dec. 5, 2000

[54] HIGH DENSITY MAGNETIC RECORDING MEDIUM WITH HIGH HR AND LOW MRT

[75] Inventors: Zhong (Stella) Wu, Fremont; Rajiv Yadav Ranjan, San Jose, both of Calif.

[73] Assignee: Seagate Technology, Inc., Scotts Valley, Calif.

[21] Appl. No.: 09/188,678

[22] Filed: Nov. 10, 1998

Related U.S. Application Data

[60] Provisional application No. 60/069,537, Dec. 12, 1997.

[51] Int. Cl.$^7$ ............................................ G11B 5/66
[52] U.S. Cl. .................. 428/332; 428/336; 428/694 T; 428/694 TS; 428/900
[58] Field of Search .................. 428/694 T, 694 TS, 428/900, 332, 336

[56] References Cited

U.S. PATENT DOCUMENTS

| | | | |
|---|---|---|---|
| 5,800,931 | 9/1998 | Lee | 428/611 |
| 5,993,956 | 11/1999 | Lambeth | 428/332 |
| 6,010,795 | 1/2000 | Chen | 428/611 |
| 6,022,609 | 2/2000 | Geo | 428/141 |
| 6,077,603 | 6/2000 | Zhang | 428/332 |

OTHER PUBLICATIONS

D. E. Laughlin, et al; IEEE Transactions on Magnetics, vol. 32, No. 5, Sep. 1996.

"Effects of Cr Intermediate Layers on CoCrPt Thin Film Media on NiAl Underlayers", Li–Lien Lee et al., IEEE Transactions on Magnetics, vol. 31, No. 6, Nov. 1995.

"NiAl Underlayers for CoCrTa Magnetic Thin Films", Li–Lien Lee, et al., IEEE Transactions on Magnetics, vol. 30, No. 6, Nov. 1994.

"Seed Layer Induced (002) Crystallographic Texture in NiAl Underlayers", Li–Lien Lee et al., Journal of Applied Physics Vol. 79, No. 8, Apr. 15, 1996.

"The Control and Characterization of the Crystallographic Texture of Longitudinal Thin Film Recording Media", David E. Laughlin, et al., IEEE Transactions on Magnetics, vol. 32, No. 5, Sep. 1996.

"The Role of NiAl Underlayers in Longitudinal Recording Media (abstract)", C.A. Ross, et al., Journal of Applied Physics, vol. 81, No. 8, Apr. 15, 1997.

*Primary Examiner*—Leszek Kiliman
*Attorney, Agent, or Firm*—McDermott, Will & Emery

[57] ABSTRACT

A magnetic recording medium exhibiting high in-plane anisotropy at low Mrt is formed employing a NiAl seedlayer and a CrMn underlayer thereon. Embodiments include magnetic recording media with a CoCrPtTa magnetic alloy layer exhibiting a Hr greater than 2800 Oe with a Mrt no greater than 0.5 memu/cm$^2$. The resulting media also exhibit high S* and low media noise.

13 Claims, 4 Drawing Sheets

HIGH DENSITY MAGNETIC RECORDING MEDIUM WITH HIGH HR AND LOW MRT

RELATED APPLICATIONS

This application claims priority from Provisional Application Ser. No. 60/069,537, filed on Dec. 12, 1997 entitled "MEDIA DESIGN FOR HIGH DENSITY APPLICATION WITH HIGH Hc and LOW Mrt", the entire disclosure of which is hereby incorporated herein by reference.

This application contains subject matter related to subject matter disclosed in copending U.S. patent application Ser. No. 09/188,331, filed on Nov. 9, 1998 now pending.

TECHNICAL FIELD

The present invention relates to magnetic recording media, such as thin film magnetic recording disks, and to a method of manufacturing the media. The present invention has particular applicability to high areal density magnetic recording media exhibiting low noise and high remanent coercivity at low magnetic film thickness.

BACKGROUND ART

The requirements for increasingly high areal recording density impose increasingly greater demands on thin film magnetic recording media in terms of remanent coercivity (Hr), magnetic remanance (Mr), coercivity squareness (S*), medium noise, i.e., signal-to-noise ratio (SNR), and narrow track recording performance. It is extremely difficult to produce a magnetic recording medium satisfying such demanding requirements.

The linear recording density can be increased by increasing the coercivity of the magnetic recording medium. However, this objective can only be accomplished by decreasing the medium noise, as by maintaining very fine magnetically non-coupled grains. Medium noise is a dominant factor restricting increased recording density of high density magnetic hard disk drives. Medium noise in thin films is attributed primarily to inhomogeneous grain size and intergranular exchange coupling. Accordingly, in order to increase linear density, medium noise must be minimized by suitable microstructure control.

A conventional longitudinal recording disk medium is depicted in FIG. 1 and comprises a substrate 10, typically Aluminum (Al) or an (Al)-alloy, such as an Al-magnesium (AlMg__ alloy, plated with a layer of amorphous nickel-phosphorus (NiP). Alternative substrates include glass, ceramic and glass-ceramic materials, silicon, plastic, as well as graphite. There are typically sequentially sputter deposited on each side of substrate 10 and adhesion enhancement layer 11, 11', e.g., chromium (Cr) or a Cr alloy, a seedlayer 12, 12', such as NiP, an underlayer 13, 13' such as Cr or a Cr alloy, a magnetic layer 14, 14', such as cobalt (Co)-based alloy, and a protective overcoat 15, 15', such as a carbon-containing overcoat. Typically, although not shown for illustrative convenience, a lubricant topcoat is applied on the protective overcoat 15, 15'.

It is recognized that the magnetic properties, such as Hr, Mr, S* and SNR, which are critical to the performance of a magnetic alloy film, depend primarily upon the microstructure of the magnetic layer which, in turn, is influenced by the underlying layers, such as the underlayer. It is recognized that underlayers having a fine grain structure are highly desirable, particular for growing fine grains of hexagonal close packed (HCP) Co alloys deposited thereon.

It has been reported that nickel-aluminum (NiAl) films exhibit a grain size which is smaller than similarly deposited Cr films which are the underlayer of choice in conventional magnetic recording media. Li-Lien Lee et al., "NiAl Underlayers For CoCrTa Magnetic Thin Films", IEEE Transactions on Magnetics, Vol. 30, No. 6, pp. 3951–3953, 1994. Accordingly, NiAl thin films are potential candidates as underlayers for magnetic recording media for high density longitudinal magnetic recording. However, it was found that the coercivity of a magnetic recording medium comprising an NiAl underlayer is too low for high density recording, e.g. about 2,000 Oersteds (Oe).

Lee et al. subsequently reported that the coercivity of a magnetic recording medium comprising a NiAl underlayer can be significantly enhanced by depositing a plurality of underlayers containing alternative NiAl and Cr layers rather than a single NiAl underlayer. Li-Lien Lee et al., "Effects of Cr Intermediate Layers on CoCrPt Thin Film Media on NiAl Underlayers," Vol. 31, No. 6, November 1995, pp. 2728–2730. It was found, however, that such a magnetic recording medium is characterized by an underlayer structure exhibiting a (110)-dominant crystallographic orientation which does not induce the preferred (1120)-dominant crystallographic orientation in the subsequently deposited Co alloy magnetic layer and is believed to contribute to increased media noise.

Li-Lien Lee et al. were able to obtain an underlayer exhibiting a (200)-dominant crystallographic orientation by initially depositing a Cr sub-underlayer directly on the non-magnetic substrate at an undesirably high temperature of about 260° C. using radio frequency (RF) sputtering. However, deposition of a Cr sub-underlayer at such an elevated temperature undesirably results in large grains, which is inconsistent with the reason for employing NiAl as an underlayer. On the other hand, it is very difficult to obtain a Cr (200)-dominant crystallographic orientation, even at elevated temperature such as 260° C., on glass, ceramic and glass ceramic substrates using direct current (DC) magnetron sputtering, which is widely employed in the magnetic recording media industry.

Li-Lien Lee et al. recognized the undesirability of resorting to high deposition temperatures to obtain a (200)-dominant crystallographic orientation in the underlayer structure. It was subsequently reported that an underlayer structure exhibiting a (200)-dominant crystallographic orientation was obtained by depositing a magnesium oxide (MgO) seedlayer using radio frequency (RF) sputtering. Li-Lien Lee et al., "Seed layer induced (002) crystallographic texture in NiAl underlayers," J. Appl. Phys. 79 (8), 15 April 1996, pp. 4902–4904; and David E. Laughlin et al., "The Control and Characterization of the Crystallographic Texture of the Longitudinal Thin Film Recording Media," IEEE Transactions on Magnetics, Vol. 32, No. 5, September 1996, pp. 3632–3637. Such a magnetic recording medium, however is not commercially viable from an economic standpoint, because sputtering systems in place throughout the industry making magnetic recording media are based upon direct current (DC) sputtering. Accordingly, RF sputtering an MgO seedlayer is not economically viable. The use of an NiAl underlayer is also disclosed by C.A. Ross et al., "The Role Of An NiAl Underlayer In Longitudinal Thin Film Media" and J. Appl. Phys. 81(a), P.4369, 1996.

Various efforts have been made to optimize the magnetic properties of a magnetic recording medium by achieving a desirable crystallographic structure in a magnetic film employed to store information. These efforts involve the use of different materials for the seedlayer, underlayer or buffer layer, as well as varying sputtering parameters, including the substrate temperature, sputtering power density, substrate bias, film thickness, sputtering gas environment and sputtering pressure. In order to achieve a strong in-plane magnetic anisotropy with high Hr and high recording signal, it is necessary to form the easy magnetic axis of the magnetic layer so that it is substantially aligned in the film plane.

As the demand for higher areal recording density increases, the thickness of the magnetic film employed in the magnetic recording medium decreases. However, there is a superparamagnetic limit where the grain size of the magnetic layer becomes less thermally stable with a reduction in grain size. Consequently, a small thermal agitation will deteriorate the stored magnetic information. Moreover, even before the superparamagnetic limit is reached, as the film thickness is reduced, additional factors negatively impact magnetic coupling, such as the smaller grain size and the non uniformity of the films. These factors all reduce in-plane magnetic anisotropy and, consequently, reduce Hr within a certain Mrt range. Currently, for most of the materials, the Mrt range at which a dramatic decrease in Hr is observed is about 0.5 memu/cm$^2$. In fact, it is typically found that at for most, using current magnetic recording medium manufacturing process, the Hr is reduced by up to about 50% of its maximum value at an Mrt of about 0.4 memu/cm$^2$.

There exists a need for magnetic recording media having high in-plane anisotropy at a low film thickness. There exists a particular need for magnetic recording media suitable for high areal recording density exhibiting a high Hr at a Mrt less than about 0.5 memu/cm$^2$.

DISCLOSURE OF THE INVENTION

An object of the present invention is a magnetic recording medium for high areal recording density exhibiting high in-plane magnetic anisotropy, high Hr and low noise at a low Mrt.

Additional objects, advantages and other features of the present invention will be set forth in part in the description which follows and in part will become apparent to those having ordinary skill in the art upon examination of the following only to be learned from the practice of the present invention. The objects and advantages of the present invention may be realized and obtained as particularly pointed out in the appended claims.

According to the present invention, the foregoing and other objects are achieved by a magnetic recording medium comprising a non-magnetic substrate; a nickel aluminum (NiAl) seedlayer on the substrate; a chromium manganese (CrMn) underlayer on the seedlayer; and a magnetic layer on the underlayer.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature, not as restrictive.

DESCRIPTION OF THE INVENTION

The present invention provides magnetic recording media exhibiting high in-plane anisotropy at significantly reduced magnetic film thicknesses vis-à-vis conventional magnetic recording media. The present invention enables the manufacture of magnetic recording media for high areal recording density exhibiting high in-plane magnetic anisotropy at Mrt values significantly less than 0.5 memu/cm$^2$, e.g. at Mrt values of about 0.26 memu/cm$^2$. Thus, magnetic recording media in accordance with the present invention exhibit a higher Hr than conventional magnetic recording media for low Mrt values. Magnetic recording media in accordance with the present invention also exhibit a high S*, high SNR, a narrow pulse width and high overwrite. These objectives are achieved in accordance with embodiments of the present invention by providing a seedlayer-underlayer structure comprising a NiAl seedlayer and a chromium manganese (CrMn) underlayer.

In embodiments of the present invention, the NiAl underlayer typically comprises about 40 to about 60 at. % Al while the CrMn underlayer typically comprises about 10 to about 50 at. % Mn. The NiAl underlayer typically has a thickness of about 10 Å to about 1000 Å, e.g. about 100 Å to about 500 Å. The CrMn underlayer typically has a thickness of about 10 Å to about 500 Å, e.g. about 50 Å to about 200 Å.

The magnetic layer employed in accordance with the present invention can comprise any magnetic material employed in the manufacture of conventional magnetic recording media, such as Co alloys. Suitable Co alloys for use in the present invention include cobalt-chromium-platinum-tantalum (CoCrPtTa), CoCrTa and CoCrPt. The magnetic layer can advantageously be deposited at a low film thickness of about 10 Å to about 300 Å, e.g. about 50 Å to about 100 Å.

Figure 1:
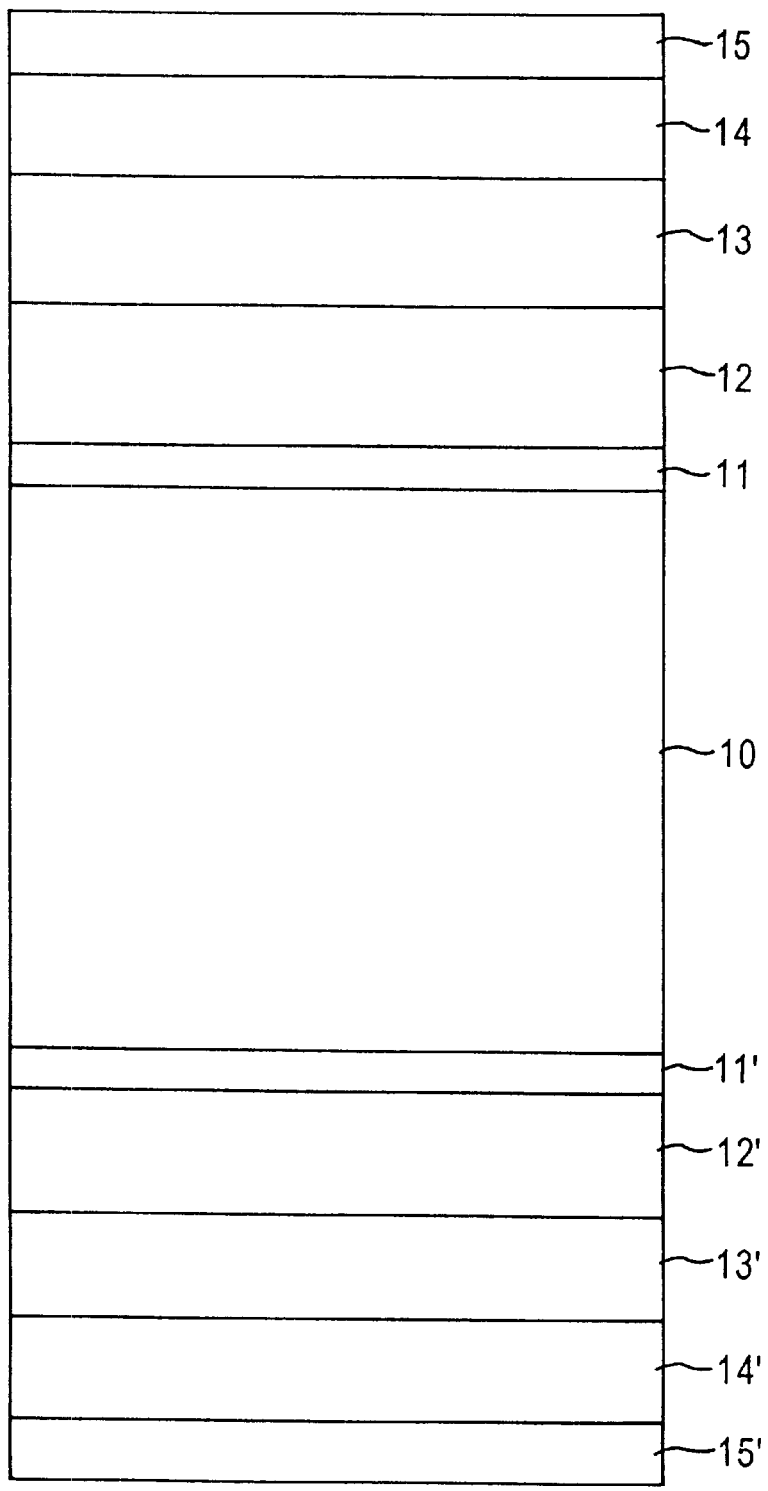
FIG. 1 schematically illustrates a conventional magnetic recording medium.
Figure 2:
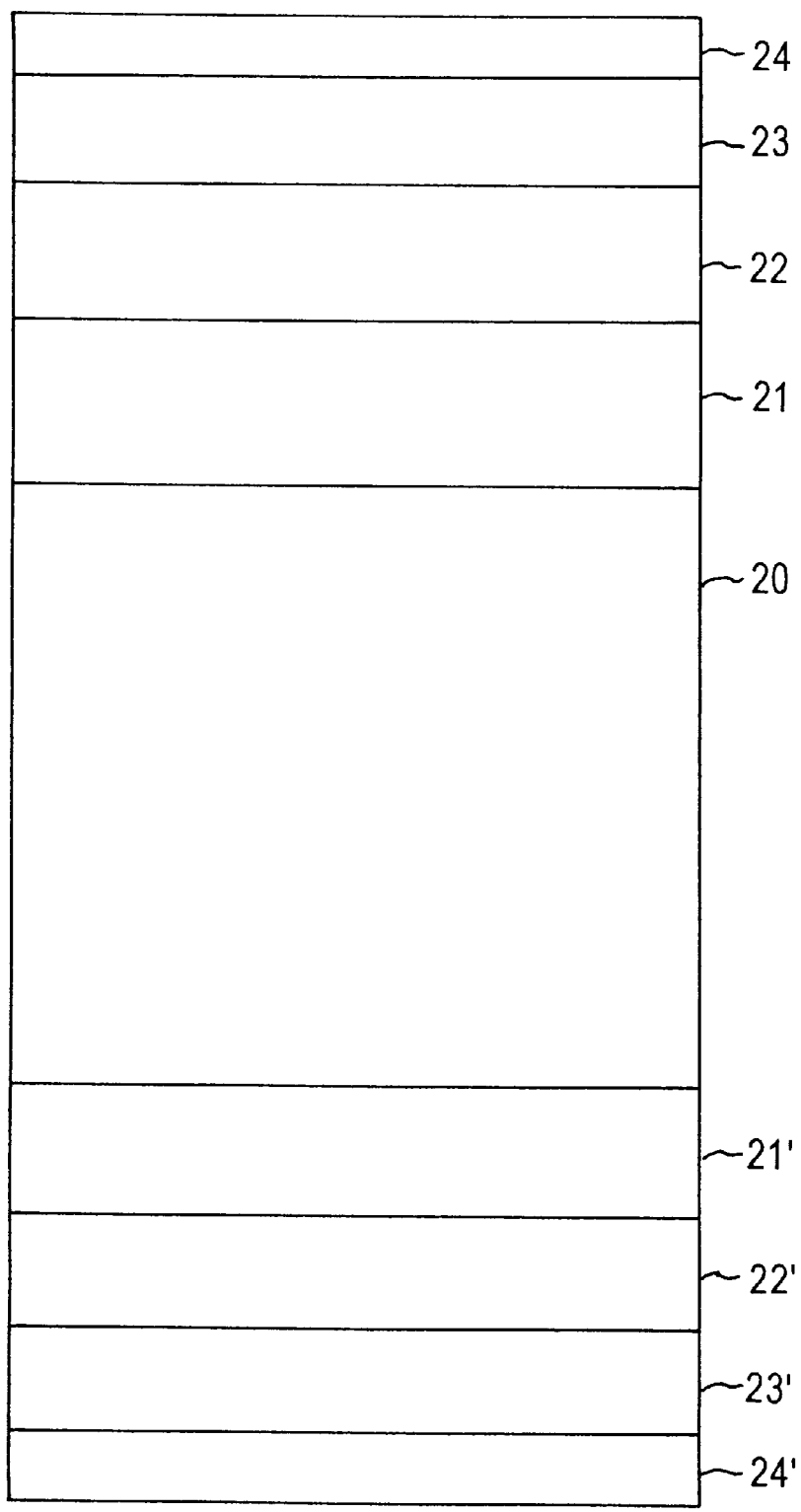
FIG. 2 schematically illustrates a magnetic recording medium in accordance with an embodiment of the present invention.

Magnetic recording media in accordance with the present invention can be provided on a non-magnetic substrate comprising any of the non-magnetic substrate materials employed in manufacturing conventional magnetic recording media, such as NiP-plated Al or Al alloys, glass, ceramic, or glass-ceramic materials. Conventional carbon-containing protective overcoats and lubricant top coats are also employed in producing magnetic recording media of the present invention. The present comprising a NiAl seedlayer and CrMn underlayer can, therefore, take the form of the magnetic recording medium depicted in FIG. 1 wherein seedlayer 12, 12' comprises NiAl and underlayer 13, 13' comprises CrMn. Another embodiment of the present invention is schematically illustrated in FIG. 2 and comprises substrate 20, seedlayer 21, 21' comprising NiAl, underlayer 22, 22' comprising CrMn, magnetic layer 23, 23', carbon-containing protective overcoat 24, 24' and a lubricant top-coat (not shown). In this embodiment, an optional adhesion promoting layer has been omitted.

EXAMPLES

Example 1

Figure 3A:
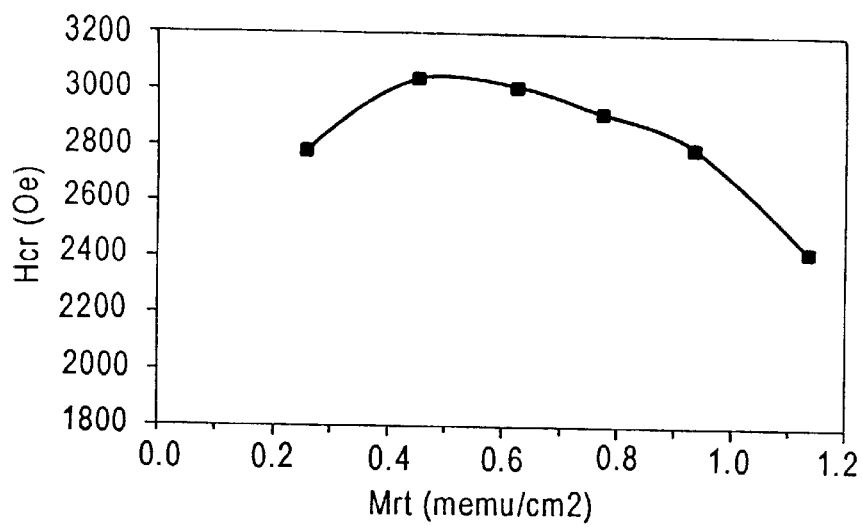
FIGS. 3A–3C illustrate the Hr, S* and SNR, respectively, of an embodiment of the present invention for varying Mrt values.
Figure 3B:
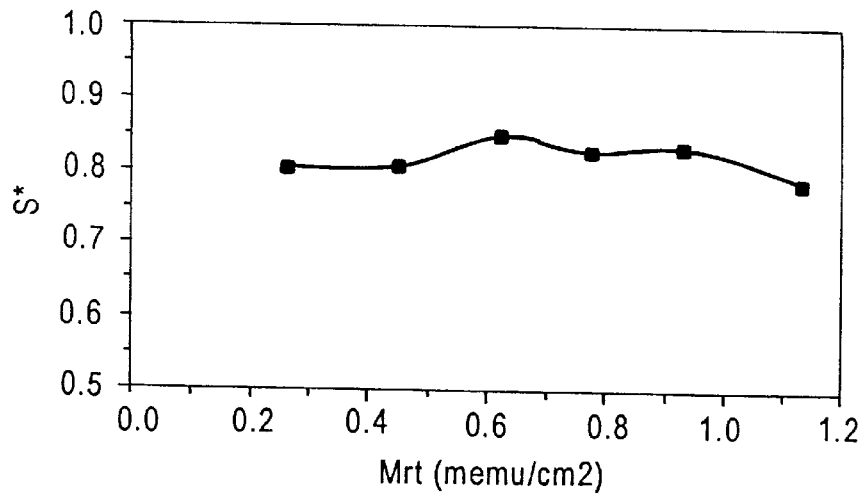
Figure 3C:
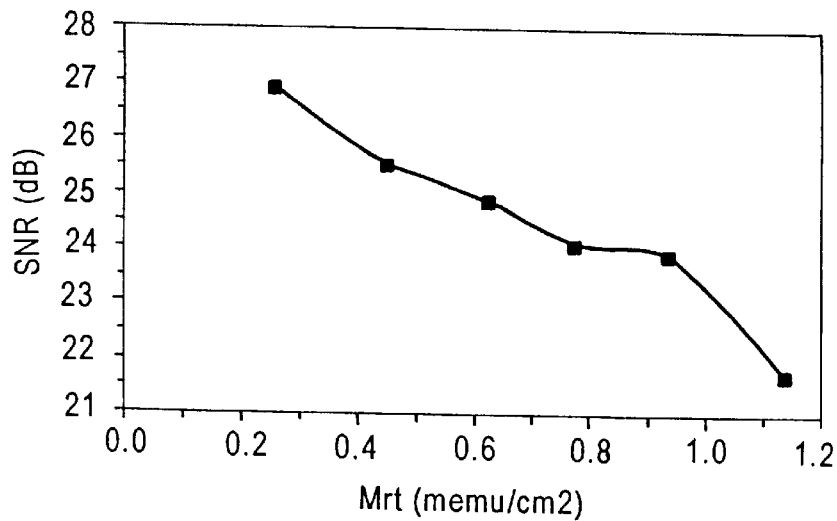

Six magnetic recording media were formed, each comprising a NiP-plated Al substrate having an average surface roughness (Ra) of 6 Å. A NiAl seedlayer comprising 50 at. % Al was sputter deposited on the substrate and a CrMn underlayer containing 20 at. % Mn was sputter deposited on the NiAl seedlayer. Sputtering was conducted in a DC magnatron sputtering apparatus. The base pressure was maintained at about $10^{-7}$ Torr. The substrate was heated to in excess of 100° C. and the sputtering pressure was maintained in the range of about 5 to about 15 mTorr. A CoCrPtTa alloy layer of varying thicknesses between about 50 Å to about 300 Å containing 16 at. % Cr, 5 at. % Pt and 4 at. % Ta, was deposited on the CrMn underlayer. Each magnetic recording medium contained the same film structure and was produced under substantially the same conditions except that the Mrt of the magnetic layer was varied and, therefore, the magnetic layer thickness was varied. The magnetic properties of the samples were tested on a calibrated non-destructive rotating disk magnetometer. The recording signal and medium noise was measured at 240 kfci (kiloflux reversal per inch) linear density using a Guzik tester with a MR (magnetoresistive) head having a gap length of about 0.5 μm and flying at a height of 1.1 micro inch. The results are reported in FIGS. 3A–3C, showing the Hr, S* and SNR, respectively, as a function of Mrt.

Example 2

Figure 4A:
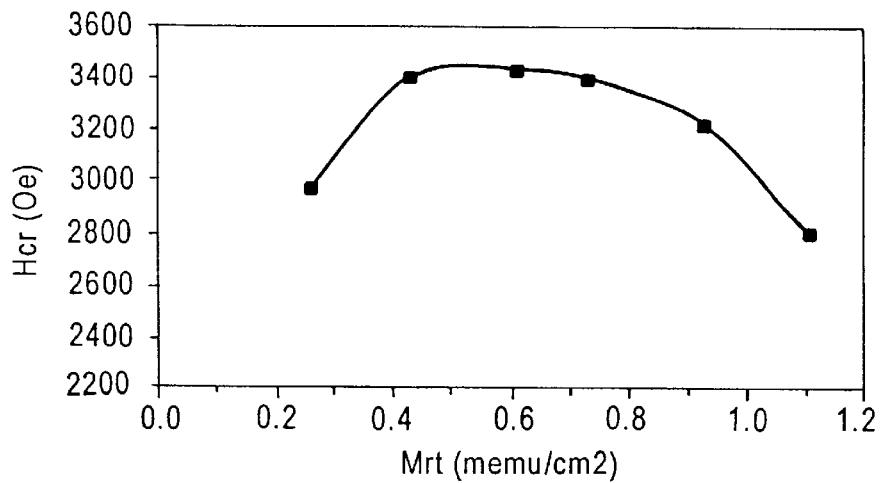
FIGS. 4A–4C illustrate the Hc, S* and SNR, respectively, of another embodiment of the present invention with varying Mrt values.
Figure 4B:
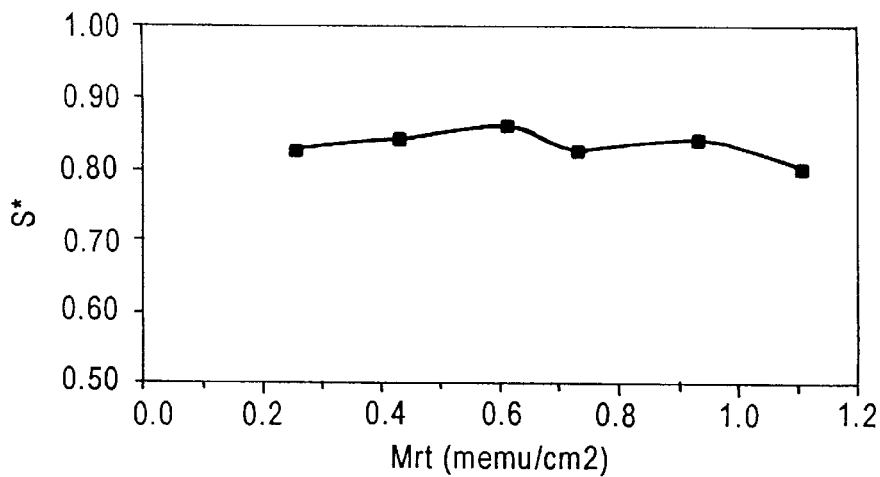
Figure 4C:
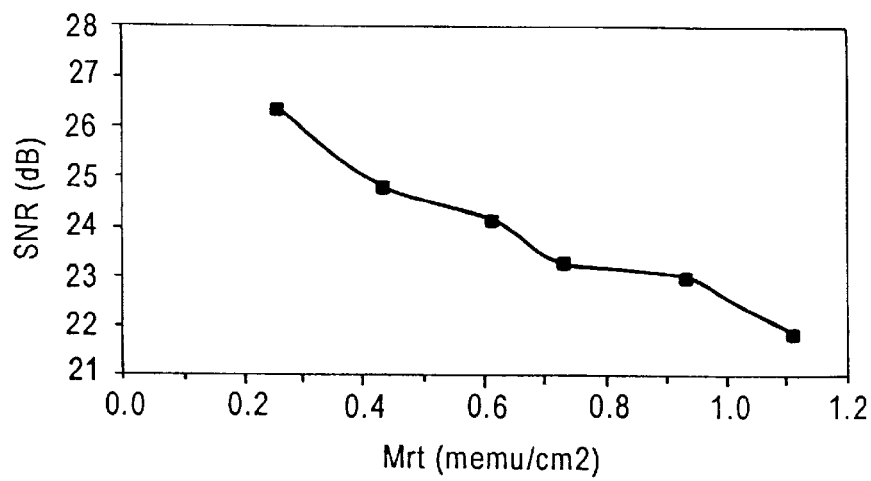

Six additional media were prepared having the same structure and the same manner as those in Example 1, except that the magnetic layer was a CoCrPtTa alloy containing 15 at. % Cr, 8 at. % Pt and 4 at. % Ta. The results showing the Hr, S* and SNR, respectively, are reported in FIGS. 4A–4C.

It is apparent from FIGS. 3A–3C and 4A–4C that the use of a NiAl/CrMn seedlayer underlayer structure in accordance with the present invention achieved a very high Hr at a very low magnetic film thickness range, with an Mrt value at 0.26 memu/cm². In addition, the S* was maintained above 0.8, thereby indicating strong magnetic coupling in the extremely thin films. Additionally, the SNR was desirably high.

In Table I below, Sample 1 is the magnetic recording medium of Example I which had the lowest Mrt value, while Sample 2 is the medium of Example 2 which had the lowest Mrt value. As seen in Table 1, the SNR values were 26.9 dB and 26.4 db, respectively, while the PW50 (pulse width) values were quite narrow. Moreover, the OW (overwrite) values for both samples exceeded 36 dB, thereby indicating superior recording performance.

TABLE I

| Sample | Hr(Oe) | Mrt(memu/cm²) | S* | SNR (dB) | PW50 (uin) | OW (dB) |
|---|---|---|---|---|---|---|
| 1 | 2790 | 0.26 | 0.84 | 26.9 | 9.4 | 39.9 |
| 2 | 2976 | 0.26 | 0.83 | 26.4 | 9.2 | 36.9 |

The demagnetization transition width is proportional to the ratio of Mrt/Hr. Accordingly, in order to achieve a higher recording density, magnetic recording media having a low Mrt/Hr ratio are desirable while maintaining other appropriate magnetic properties. The results reported in FIGS. 3A–3C and 4A–4C illustrate that magnetic recording media in accordance with the present invention exhibit desirably low Mrt/Hr ratios, while maintaining strong magnetic coupling and achieving superior reading/writing performance. Accordingly, magnetic recording media in accordance with the present invention are suitable for ultra high density recording. The present invention enables the manufacture of magnetic recording media having a Hr in excess of 2900 Oe while maintaining a Mrt value less than 0.30 memu/cm².

The present invention can be employed to produce any of various types of magnetic recording media, particularly thin film disks. The present invention is particularly applicable to producing high areal recording density magnetic recording media requiring a low flying height and exhibiting a low Mrt/Hr ratio, low media noise and high S*.

Only the preferred embodiment of the present invention and but of a few examples of its versatility are shown and described in the present disclosure. It is to be understood that the present invention is capable of various other combinations and environments and is capable of changes and modifications within the scope of the inventive concept as expressed herein.

What is claimed is:

1. A magnetic recording medium comprising:
   a non-magnetic substrate;
   a nickel aluminum (NiAl) seedlayer on the substrate;
   a chromium manganese (CrMn) underlayer on the seedlayer; and
   a magnetic layer on the underlayer.

2. The magnetic recording medium according to claim 1, wherein the NiAl seedlayer contains about 40 to 60 at. % aluminum.

3. The magnetic recording medium according to claim 2, wherein the CrMn underlayer contains about 10 to about 50 at. % manganese.

4. The magnetic recording medium according to claim 1, wherein;
   the NiAl seedlayer has a thickness of about 10 Å to about 1000 Å; and
   the CrMn underlayer has a thickness of about 10 Å to about 500 U.

5. The magnetic recording medium according to claim 4, wherein the NiAl seedlayer has a thickness of about 100 Å to about 500 Å; and
   the CrMn underlayer has a thickness of about 50 Å to about 200 Å.

6. The magnetic recording medium according to claim 1, wherein the magnetic layer has a thickness of about 10 Å to about 300 Å.

7. The magnetic recording medium according to claim 6, wherein the magnetic layer has a thickness of about 50 Å to about 100 Å.

8. The magnetic recording medium according to claim 1, wherein the magnetic layer comprises a cobalt alloy.

9. The magnetic recording medium according to claim 8, wherein the cobalt alloy comprises cobalt-chromium-platinum tantalum, cobalt-chromium-tantalum or cobalt-chromium-platinum.

10. The magnetic recording medium according to claim 9, wherein the cobalt alloy comprises cobalt-chromium-platinum tantalum.

11. The magnetic recording medium according to claim 1, having;
   a Mrt less than about 0.5 memu/cm²; and
   an in-plane magnetic anisotropy of about 4000 Oe.

12. The magnetic recording medium according to claim 11, wherein the Mrt is no greater than about 0.30 memu/cm².

13. The magnetic recording medium according to claim 11, having a remanent coercivity greater than about 2800 oersteds.

* * * * *